Sept. 21, 1965  S. E. ATHEY  3,207,967

MULTI-SPEED ELECTRIC MOTOR DRIVE

Filed Oct. 6, 1961

INVENTOR.
STUART E. ATHEY
BY
Marechal, Biebel, French & Bugg
ATTORNEYS

United States Patent Office 3,207,967
Patented Sept. 21, 1965

3,207,967
MULTI-SPEED ELECTRIC MOTOR DRIVE
Stuart E. Athey, Troy, Ohio, assignor to The Hobart Manufacturing Company, Troy, Ohio, a corporation of Ohio
Filed Oct. 6, 1961, Ser. No. 143,387
3 Claims. (Cl. 318—221)

This invention relates to multi-speed electric motor drives, and particularly to such drives as applied to food mixing apparatus.

In various machines which employ an electric drive motor it may be desirable to operate the machine for a short period of time at a speed substantially less than the normal drive speed of the motor. In particular, food mixing machines normally have an electric drive motor which operates the mixing device at a predetermined speed, or multiples of speed, as by driving through a gear transmission in which several drive ratios may be manually selected. This is particularly true of the relatively larger commercial types of food mixers for restaurant or institutional use, having bowl capacities of twenty or thirty quarts, for example. Even the slowest of the speeds possible through the transmission may be excessive for such short duration operations as blending flour into a batch of bread dough which is already mixing in the bowl. Unless the operator is quite careful, the dry flour being blended in can be thrown out into the area surrounding the bowl.

Accordingly, the primary object of this invention is to provide a novel electrically variable drive for food mixing machines and the like wherein the motor can be deliberately operated for a relatively short duration at a predetermined speed substantially less than its normal operating speed.

Another object of this invention is to provide a novel circuit arrangement for electric motor drives, particularly induction motors having separate starting poles which, in combination with a suitable phase displacing device such as a capacitor, are disconnected from the running circuit of the motor except during starting, wherein such motors can be deliberately operated with a number of poles greater than its number of running poles, thereby running at a lesser speed from the same power source.

A further object of this invention is to provide such a circuit arrangement in which the operator must hold a switch contact closed at all times when the motor is running with such greater number of poles, to assure that the motor cannot continue to run in this fashion for a time long enough to overheat and possibly damage the motor.

An additional object of this invention is to provide a novel switching circuit for electric motors, capable of changing from a lesser number of poles to a greater number of poles, and thus effecting a predetermined speed reduction, only after the motor has been brought up to its normal speed in the usual fashion and the windings are then completely disconnected from the power source to avoid arcing at the contacts of the switching relays when changing the connections between the starting and running windings of the motor.

Other objects and advantages of the invention will be apparent from the following description, the accompanying drawing and the appended claims.

In the drawing—

Figure 1:
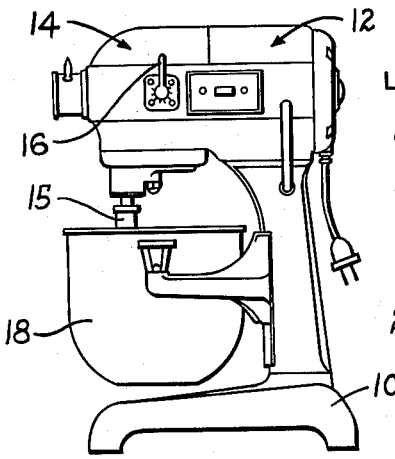
FIG. 1 is a side elevational view of a typical mixing machine to which the present invention is applied.

Referring to the drawing, which shows a preferred embodiment of the invention, and particularly to FIG. 1, the mixer includes a base 10 mounting a motor 12 which drives through a variable transmission 14 a mixing member 15. The lever 16 provides a manual control for selecting the desired transmission ratio. The member 15 operates on the foodstuffs or similar material which is placed in the bowl 18. Further details of typical such machines are shown in United States Patents Nos. 1,864,209 and 1,849,094.

For purposes of explanation the motor 12 is described as of the four pole induction type with a conventional laminated rotor (not shown) and a slotted stator in which the main windings are shown on a greater radius than the starting windings, but it will be appreciated that this may not be the physical arrangement in an actual motor. The main windings are placed to form the main or running poles 20, and are also designated by their terminal connections T1–T2 and T3–T4. Similarly, the starting poles 25 are formed by the starting windings T5–T6 and T7–T8.

Figure 3:
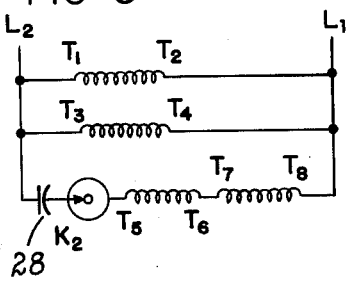
FIGS. 3 and 4 are schematic diagrams showing the change in the circuits of the motor windings.

The normal starting and running circuits for the motor are shown in FIG. 3, with all contacts illustrated in the stopped condition. Thus the main windings are in one circuit (they may be either in parallel or in series with each other, depending upon the impressed voltage) and the starting windings are in a parallel circuit which includes the phase displacing means, such as the starting capacitor 28, and the normally closed centrifugal switch K2 which is driven by the motor, and which will open in known manner to break the starting circuit at a predetermined speed, after which the motor will assume its running speed with the four main poles in the only remaining energized circuit.

For purposes of switching the circuit connections of the windings there are relay means which can be selectively actuated by the operator. Actually one nine contact relay would do, but since most relays are commercially available with only four or five contacts the relay means are illustrated as two separate and simultaneously operating coils R1 and R2, the former having contacts R1A, R1B, R1C, and R1D, and the latter having contacts R2A, R2B, R2C, R2D, and R2E. The power supply or input lines are designated as L1 and L2, and at least one of them includes the normal start and stop switch 30, which will remain open or closed as it is actuated, for example a toggle switch.

Under normal operation, switch 30 is closed, completing the main winding circuits from L2, T1, T2, R1D (normally closed) to L1, and from L2, R2C (normally closed), T3, T4, R2D (normally closed), R1D to L1. The starting windings are energized by completing a circuit through L1, T8, T6 and T7, T5, R1C (normally closed), capacitor 28, and through K2 to K1, T3, R2C, to L2. When the motor reaches a predetermined speed K2 opens and only the running circuit remains energized.

A shunt circuit is formed around switch 30 by a manually operable switch 35, which is urged open at all times, together with the normally closed motor driven centrifugal switch K5. Switch 35 can be closed only under deliberate and maintained pressure by the operator. K5 is set to open at the same time as K2 opens.

Closing of switch 35 also prepares the energizing circuits of the coils of the relays R1 and R2, but this circuit is held open by the normally open centrifugal switch K4, which will not close until after K2 and K5 have opened. When this occurs, a holding circuit is formed through contacts R2E, keeping the relays energized even if K4 again opens. It should be noted that the relay circuits are not completed until after K2 has opened the normal starting circuit.

Figure 2:
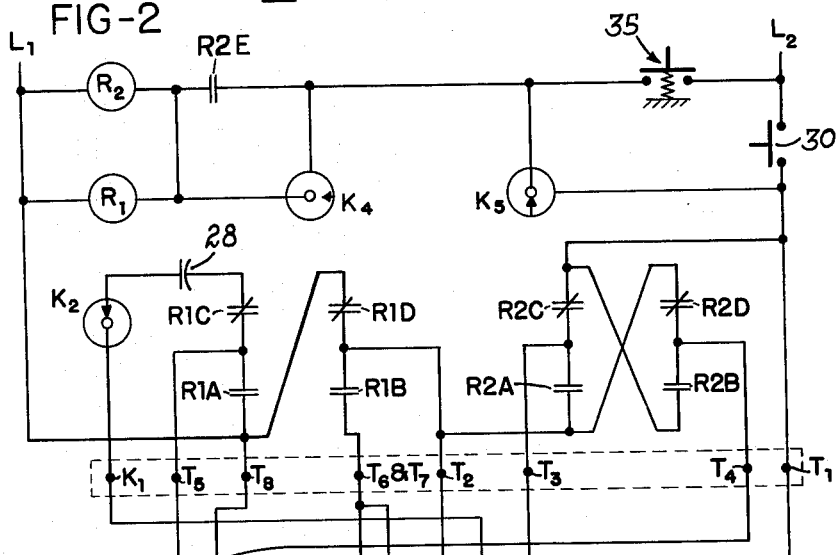
FIG. 2 is a schematic wiring diagram showing the features of the invention as applied to a four pole induction motor with a four pole capacitor-start circuit.
Figure 4:
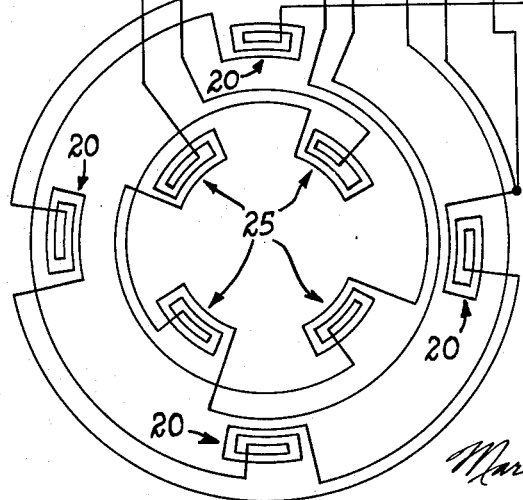
Figure 4:
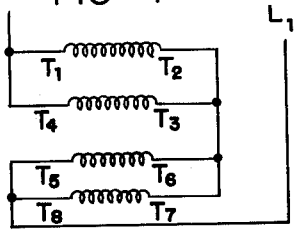

With the relay means energized, the windings are now connected as an eight pole motor. The starting windings T5-T6 and T7-T8 are in parallel with each other and are in turn connected in series with the parallel connected main windings T1-T2 and T3-T4. This circuit is shown in FIG. 4 and can be traced in FIG. 2 as follows. The main windings are connected from L2, T1, T2, R2A to T3 and L2, R2B, to T4. From T3 the starting windings are connected through R2A, R1B, T6 and T7, to T8 and L1, and T6 and T7 to T5, R1A to L1.

The motor is thus prepared to run as an eight pole machine, but it will not do so until the rotor slows permitting K5 again to close and opening K4, which has no effect because of the holding circuit. With R1C now open, K2 is out of the circuit together with capacitor 28. The eight pole connections are maintained until the operator releases switch 35, which will break the holding circuit of the relays and cause the motor to stop unless the switch 30 is closed in the meantime.

In an actual circuit according to the invention the centrifugal switches are combined as one multiple contact switch having one open (K4) and two normally closed (K2 and K5) contacts. Also, an effective arrangement may be obtained by combining switches 30 and 35 in a center-off toggle switch which is provided with a spring load on one side (switch 35) requiring that the button be continually depressed in that direction to maintain contact, while the other side forms the on-off switch 30.

The present invention, therefore, provides a novel circuit arrangement for operating an electric motor at different speeds by changing the number of running poles, whereby the provision of more poles in the running circuit will operate the motor at a lower speed. Since in accordance with the invention the starting windings of the motor are employed as part of the larger number pole circuit, and since such starting windings are normally not intended for continuous duty, the low speed running circuit must be deliberately and physically maintained by the operator, and heat rise ratings can be obtained such that it would be extremely difficult for the operator to continue to hold switch 35 closed for a sufficient time to overheat the motor. As a typical example, a four pole capacitor-start induction motor has been constructed in accordance with the invention running at a normal 1750 r.p.m., with a 50° C. temperature rise for continuous running. When employing the four starting poles as part of the eight pole running circuit, thus running the motor at approximately 875 r.p.m., a rating of 50° C. temperature rise for thirty minutes running has been attained.

With such an electric motor drive combined with a mixing machine, in accordance with the invention, it is possible for the operator to hold switch 35 closed while blending in powdery or flaky materials or the like, thus performing the blending operation at a mixing speed which is approximately one-half the lowest speed obtainable through transmission 14 under normal running conditions.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A multi-speed electric motor having main windings forming normal running poles and starting windings forming additional starting poles; power input lines to said motor; relay means including at least one coil means and first and second normally open contacts and first and second normally closed contacts all controlled by said coil means; a normal running circuit including the first normally closed contacts and said main windings connected across said input lines; a starting circuit including the second normally closed contacts, a phase displacing means, a first normally closed centrifugal switch driven by said motor, and said starting windings all connected across said input lines with said first centrifugal switch controlling the energizing of said starting circuit; a first switch in one of said input lines adapted to maintain itself in a closed position; a slow speed running circuit including first normally open contacts and said main and starting windings all connected with said starting and main windings in series across said input lines; a normally controlled normally open second switch requiring deliberate maintained operation for closing thereof; a shunt circuit around said first switch including said second switch and a second normally closed centrifugal switch driven by said motor, said second switch being connected to the one input line ahead of said first switch; an energizing circuit for said relay means including said coil means, a normally open centrifugal switch driven by said motor and arranged to close after said motor has attained a speed at which said first normally closed centrifugal switch is opened, and connections placing said relay coil means in series circuit with said normally open centrifugal switch and with said second switch across said input line; and a holding circuit for said relay coil means comprising the second normally open contacts connected in shunt across said normally open centrifugal switch to maintain energization of said relay coil means upon slowing of said motor to such a degree that said normally open centrifugal switch is unable to maintain said relay energizing circuit.

2. A multi-speed electric motor having main windings forming normal running poles and starting windings forming additional starting poles; power input lines to said motor; relay means including a normally deenergized coil means and having a plurality of normally open and of normally closed contacts; means forming a normal running circuit including first ones of said normally closed contacts and said main windings connected across said input lines; a starting circuit including second ones of said normally closed contacts, a phase displacing means, a first normally closed centrifugal switch driven by said motor, and said starting windings all connected across said input lines with said first centrifugal switch controlling the energizing of said starting circuit; a selectively operable first control switch in one of said input lines; a slow speed running circuit including first ones of said normally open contacts and said main and starting windings all connected with said starting and main windings in series across said input lines; a normally open speed control switch; a shunt circuit around said first switch including said speed control switch and a second normally closed centrifugal switch driven by said motor arranged to open at approximately the same speed as said first centrifugal switch, said speed control switch being connected to the one input line ahead of said first switch; an energizing circuit for said relay means including said relay coil means, a normally open centrifugal switch driven by said motor and arranged to close after said motor has attained a speed at which said first normally closed centrifugal switch is opened, and connections placing said relay coil means in series circuit with said normally open centrifugal switch and with said speed control switch across said input lines; and a holding circuit for said relay coil means comprising a second one of said normally open contacts connected in shunt across said normally open centrifugal switch to maintain energization of said relay coil means upon slowing of said motor to such a degree that said normally open centrifugal switch is unable to maintain said relay energizing circuit.

3. In a multi-speed electric motor having main windings forming normal running poles and starting windings forming additional starting poles; power input lines to said motor; connections forming a normal running circuit between said main windings and said power input lines; connections forming a starting circuit between said power input lines and said starting windings and incorporating in circuit with said starting windings a phase displacing means and a first normally closed centrifugal switch driven by said motor and operable to disconnect said starting windings from said power input lines upon attainment of a predetermined motor speed; separate connections forming a normally inoperative slow speed running circuit between said power input lines and said starting windings and said running windings for increasing the number of operative poles of the motor and thereby to operate the motor at a reduced speed less than the speed at which said starting circuit is opened; relay means including contacts connected to said normal running circuit connections and to said normally inoperative slow speed circuit connections, respectively, to establish the slow speed running circuit connections and to disable the normal running circuit connections in response to actuation of said relay means; a speed change control circuit including a normally open slow speed switch and a second normally closed centrifugal switch driven by said motor, said normally open low speed switch and said second centrifugally operated switch being connected in a series circuit controlling the power supply from one of said input lines to all of said circuit connections whereby closing of said low speed switch will supply power to said motor until said second normally closed centrifugal switch opens; a selectively operable main control switch connected in shunt with said series circuit and operable when closed to supply power directly to said circuit connections; a speed change control circuit including a connection between said low speed switch and said normally closed centrifugal switch and incorporating a normally open centrifugal switch adapted and arranged to close upon opening of said first and second normally closed centrifugal switches and connected to supply power to actuate said relay means to establish the slow speed running circuit connections and to disable the normal running circuit connections; and a holding circuit bypassing said normally open centrifugal switch and connected directly to said speed control switch for maintaining power supply to actuate said relay means after said motor has slowed sufficiently to cause said normally open centrifugal switch to revert to its open position.

References Cited by the Examiner

UNITED STATES PATENTS

| | | | |
|---|---|---|---|
| 2,674,710 | 4/54 | Pitman | 318—221.8 X |
| 2,703,381 | 3/55 | Jepson | 318—325 |
| 2,774,024 | 12/56 | Brammerlo | 318—224 |
| 2,817,050 | 12/57 | La Cour | 318—224.1 X |
| 2,836,780 | 5/58 | List et al. | 318—221 X |
| 3,031,606 | 4/62 | Contonwine | 318—224 X |

ORIS L. RADER, *Primary Examiner.*

UNITED STATES PATENT OFFICE
CERTIFICATE OF CORRECTION

Patent No. 3,207,967 September 21, 1965

Stuart E. Athey

It is hereby certified that error appears in the above numbered patent requiring correction and that the said Letters Patent should read as corrected below.

Column 4, lines 12 and 13, for "normally controlled" read -- manually controlled --.

Signed and sealed this 19th day of April 1966.

(SEAL)
Attest:

ERNEST W. SWIDER
Attesting Officer

EDWARD J. BRENNER
Commissioner of Patents